US008385435B2

(12) United States Patent
Garrett et al.

(10) Patent No.: US 8,385,435 B2
(45) Date of Patent: Feb. 26, 2013

(54) MEASURING INTERFERENCE AND NOISE POWER USING NON-CONTENT BURST PERIODS

(75) Inventors: David Garrett, Santa Clara, CA (US); Robert Lorenz, Santa Clara, CA (US); Djordje Tujkovic, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 1255 days.

(21) Appl. No.: 11/704,743

(22) Filed: Feb. 9, 2007

(65) Prior Publication Data

US 2007/0183522 A1 Aug. 9, 2007

Related U.S. Application Data

(60) Provisional application No. 60/772,300, filed on Feb. 9, 2006.

(51) Int. Cl.
*H04K 1/10* (2006.01)
(52) U.S. Cl. ......... 375/260; 375/346; 375/316; 375/285
(58) Field of Classification Search .................. 375/260, 375/346, 316, 285; 455/59, 69, 562; 370/69.1
See application file for complete search history.

(56) References Cited

U.S. PATENT DOCUMENTS

| | | | | |
|---|---|---|---|---|
| 5,673,288 | A * | 9/1997 | Okanoue | 375/231 |
| 6,038,238 | A * | 3/2000 | Jokinen et al. | 375/130 |
| 6,131,016 | A * | 10/2000 | Greenstein et al. | 455/69 |
| 6,223,040 | B1 * | 4/2001 | Dam | 455/447 |
| 6,369,758 | B1 * | 4/2002 | Zhang | 342/383 |
| 7,012,912 | B2 * | 3/2006 | Naguib et al. | 370/343 |
| 7,301,920 | B2 * | 11/2007 | Sanders et al. | 370/328 |
| 7,590,171 | B2 * | 9/2009 | Chang et al. | 375/227 |
| 7,953,417 | B2 * | 5/2011 | Laroia et al. | 455/450 |
| 2001/0004359 | A1 * | 6/2001 | Nefedov | 370/337 |
| 2002/0018483 | A1 * | 2/2002 | Kuwabara et al. | 370/430 |
| 2003/0060244 | A1 * | 3/2003 | Ruohonen | 455/574 |
| 2004/0090947 | A1 * | 5/2004 | Wilborn et al. | 370/345 |
| 2005/0002324 | A1 * | 1/2005 | Sutivong et al. | 370/208 |
| 2006/0153145 | A1 * | 7/2006 | Voyer et al. | 370/335 |
| 2006/0211441 | A1 * | 9/2006 | Mese et al. | 455/522 |
| 2006/0229090 | A1 * | 10/2006 | LaDue | 455/507 |
| 2006/0286995 | A1 * | 12/2006 | Onggosanusi et al. | 455/522 |
| 2007/0153924 | A1 * | 7/2007 | Ling et al. | 375/260 |
| 2007/0211680 | A1 * | 9/2007 | Laroia et al. | 370/338 |
| 2007/0270100 | A1 * | 11/2007 | Agrawal et al. | 455/67.11 |

* cited by examiner

*Primary Examiner* — Shuwang Liu
*Assistant Examiner* — Helene Tayong
(74) *Attorney, Agent, or Firm* — Sterne, Kessler, Goldstein & Fox P.L.L.C.

(57) ABSTRACT

Embodiments describe a method of measuring noise and interference within transceivers of an OFDM wireless transmission system, or similar communication system, including a number of receivers communicating with one or more base stations in cell or sector arrangements. The transmitter schedules a transmission burst for a non-existent user (receiver) using wireless transmission traffic. In an OFDM system, this corresponds to a certain set of subcarriers in the time/frequency arrangement. Thus, in the receive frame structure, the data and pilot subcarriers are guaranteed to be only noise and interference from adjacent sectors. The receiver can accurately measure the noise and interference without needing to cancel out the transmitted signal. Therefore, the system is assured that there is no desired signal as part of this measurement. The noise and interference measurement process can be appropriately scheduled so that it does not impact the overall throughput of the system. This mechanism creates a deterministic place (in time and/or frequency) within the transmission, where no desired signal is required.

17 Claims, 5 Drawing Sheets

MEASURING INTERFERENCE AND NOISE POWER USING NON-CONTENT BURST PERIODS

CROSS-REFERENCE TO RELATED APPLICATIONS

The present application claims the benefit of the U.S. Provisional Application, Ser. No. 60/772,300, entitled "Noise and Interference Measurement" and filed on Feb. 9, 2006.

TECHNICAL FIELD

The embodiments provided herein relate generally to communication systems, and more specifically to measuring interference and noise in wireless receivers.

BACKGROUND

In wireless communication systems, the quality of the signal depends in large part on the amount of noise measured at the receiver antenna. In these systems, the noise figure is the ratio of the output noise power to the thermal noise in the input termination at standard noise temperature. The noise figure thus represents the ratio of actual output noise to that which would remain if the device itself was noise free, and provides an indication of the performance of a radio receiver. The noise power is typically used to denote the cumulative effects of noise figure at the receiver and the ambient (e.g. non-system) interference. The knowledge of noise power at the receiver is crucial for several blocks in the transceiver chain, which include, but are not limited to demodulation, decoding, power control, link adaptation, and similar operations.

In general, there are three main sources of noise at the receiver antenna: (1) ambient (non-system) noise or interference, which is at or near the same operating frequency range of the desired signals; (2) circuit noise, which is noise introduced or picked up by the circuits or blocks in the RF (radio frequency) stage of the receiver itself; and (3) system or system-like interference, which is introduced by other transmitters or sources of desired signals for other receivers, but not for a particular receiver. In order to design and build effective wireless receivers, it is important to know or at least be able to accurately estimate or measure the signal-to-interference-plus noise ratio (SINR) in order to ensure communication quality or rate of transmission in a wireless link. The SINR level may differ depending on the location of a receiver within a cell, sector or other geographical characteristic of the wireless system, and can also vary depending upon the composition or amount of noise versus interference, or vice-versa.

For wireless transmission systems that utilize OFDM (Orthogonal Frequency Domain Modulation) schemes or similar cellular systems, users who are on or near the boundaries between cells or sectors usually have low SINR ratios because of strong interference from terminals neighboring cells or the large distance from the basestation (transmitter). A multi-user version of OFDM is OFDMA (Orthogonal Frequency Division Multiple Access), which assigns subsets of subcarriers to individual users, thus allowing simultaneous low data rate transmission from several users. OFDMA systems may employ a "frequency reuse-one" technique, in which every cell and sector is free to utilize all of the subcarriers and symbols used in other cells and sectors. Such a system can have significant interference between sectors and cells, especially at the boundaries. In systems with lower frequency reuse, the interference may be reduced at the sector and cell boundaries, but can appear elsewhere. One issue with regard to OFDMA systems with reuse-one (or "reuse-1") mechanisms is the task of accurately measuring the noise and interference levels. In reuse-one systems, all of the subcarriers are filled with data and pilot traffic from the subscribers. In such a system, or other similar systems, it is difficult to isolate the noise and interference in specific subcarriers. One present method involves cancelling a receiver's signal to measure the remaining noise and interference. Such a cancellation process, however, is not optimum for certain systems or receivers, as some of the original signal may be injected into the measurements. It is desirable, therefore, to provide a system of measuring noise and interference that does not include or implicate the receiver's own signal.

BRIEF DESCRIPTION OF THE DRAWINGS

Embodiments are illustrated by way of example and not limitation in the figures of the accompanying drawings, in which like references indicate similar elements and in which.

INCORPORATION BY REFERENCE

Each publication, patent, and/or patent application mentioned in this specification is herein incorporated by reference in its entirety to the same extent as if each individual publication and/or patent application was specifically and individually indicated to be incorporated by reference.

DETAILED DESCRIPTION

Embodiments disclose a method of measuring noise and interference within transceivers of an OFDM wireless transmission system, or similar communication system, including a number of receivers communicating with one or more base stations in cell or sector arrangements. The transmitter schedules a transmission burst for a non-existent user (receiver) using wireless transmission traffic. In an OFDM system, this corresponds to a certain set of subcarriers in the time/frequency arrangement. Thus, in the receive frame structure, the data and pilot subcarriers are guaranteed to be only noise and interference from adjacent sectors. The receiver can accurately measure the noise and interference without needing to cancel out the transmitted signal. Therefore, the system is assured that there is no desired signal as part of this measurement. The noise and interference measurement process can be appropriately scheduled so that it does not impact the overall throughput of the system. This mechanism creates a deterministic place (in time and/or frequency) within the transmission, where no desired signal is required.

Figure 1:
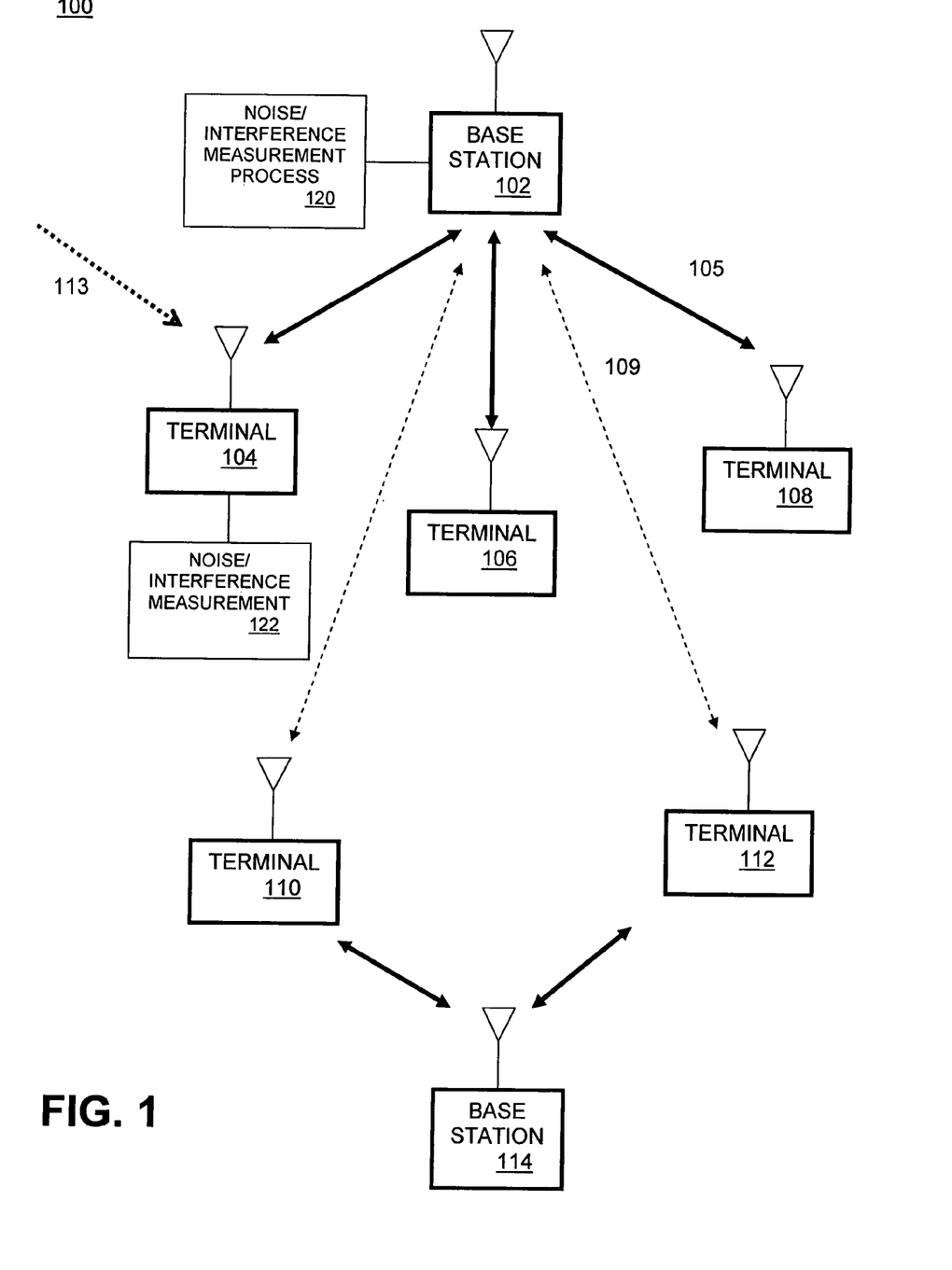
FIG. 1 illustrates a wireless system that includes a noise and interference measurement system, under an embodiment.

FIG. 1 illustrates a wireless system that includes a noise and interference measurement system, under an embodiment. In system 100, a first base station or similar wireless transmitter 102 transmits radio or similar wireless signals 106 to a plurality of transceiver terminals 104, 106, and 108 that are within a cell or sector intended for reception of such desired signals 105. For purposes of discussion, the terminals 104-108 that are within the intended range of transmissions from the basestation 102 are referred to as "target terminals" or "assigned terminal," as distinct from unintended terminals, such as terminals 110 and 112. Thus, as shown in FIG. 1, the signal from basestation 102 may also be picked up by these other terminals 110 and 112, which are properly within the range of a second base station 114. Since terminals 110 and 112 are intended only to receive desired signals from basestation 114, the signals 109 received at these terminals constitute interference with the desired signals. If the terminals 110 and 112 are near the boundary of the sector dividing basestations 102 and 114, the interference signals 109 the SINR value due to the interference signals may be unacceptably high. Other sources of spurious signals that can affect the SINR of receivers 110 and 112 can be other types of interference or noise, such as noise signal 113. As used herein, the term "noise" means ambient noise, RF noise, and noise from other sources that may interfere with the desired signal, but that are distinct from actual signals from other transceivers in the system that are not desired, and which are referred to as "system-like" interference. Thus, each terminal in FIG. 1 can receive a signal that is a composite of the desired signal plus noise plus interference. That is S=D+I+N, where S is the received signal, D is the desired signal, I is the interference and N is the noise. Embodiments of the noise and interference measurement system measure the I+N components of the received signal, S by providing a mechanism of measurement that eliminates the effect of the desired signal, D.

The terminals illustrated in system 100 of FIG. 1 may be subscriber stations or any transceiver (transmitter/receiver) device that is capable of communicating over bi-directional links to one or more of the basestations. Embodiments of the noise and interference measurement process work with both uplink (terminal-to-basestation) links, as well as downlink (basestation-to-terminal) transmissions.

In OFDM and similar systems, the SINR values directly affect the quality or rate of communication. The amount of noise and system-like interference in the signal determines the quality of the transmission link and generally dictates how much data can be carried on the line. Such information can be used in various network management processes, such as link adaptation, power control, demodulation, decoding, and the like. Thus, in order to implement measures that can filter out or compensate for such interference and noise affects, it is important to be able to accurately measure the noise and interference levels in such systems.

In one embodiment, system 100 of FIG. 1 utilizes data transmission based on frequency-division multiplexing (FDM), where each frequency sub-channel carries a separate stream of data. In a specific embodiment, OFDM (Orthogonal frequency-division multiplexing) is used. In OFDM, the sub-carrier frequencies are selected so that the modulated data streams are orthogonal to one another. This orthogonality allows for high spectral efficiency and simplifies transceiver design since separate filters are not needed for ach sub-channel. In general, OFDM is a modulation technique used in 802.11a WLAN, 802.16 and WiMAX technologies for transmitting large amounts of digital data over a radio wave. OFDM works by splitting the radio signal into multiple smaller sub-signals that are then transmitted simultaneously at different frequencies to the receiver. OFDM generally reduces the amount of crosstalk in signal transmissions.

In a further embodiment, Orthogonal Frequency Duplex Multiple Access (OFDMA) systems are used. In an OFDMA system, time and frequency are divided into sub-units called symbols (in time f) and subcarriers (in frequency k). The basestation typically assigns multiple time symbols and subcarriers to carry the data from the basestation to the terminal. Each terminal within a sector is usually assigned a distinct subset of available symbols and subcarriers, which is denoted a "slot." The number of subcarriers and symbols, and the level of modulation, which is usually a function of the SINR, determines the data rate to or from the terminal.

In one embodiment, network 100 includes a basestation 102 that includes or executes a noise/interference measurement process 120. Each configured terminal, e.g., terminal 108 also includes a client-side noise/interference measurement process 122.

Using the noise and interference measurement process 120, the basestation 102 allocates a dummy burst on the uplink (UL) traffic so that it can measure noise and interference on signals transmitted to it from the terminals. The basestation 102 can also allocate a dummy burst on the downlink (DL) traffic so that all appropriate terminals know that they can measure noise and interference on the data subcarriers with no signal from the basestation 102. In general, the dummy burst represents a portion of the communication frame or subframe that is reserved by the measurement process 120 to be free of actual desired signal or content data. It can also be referred to as an "empty" burst or any similar name. In one embodiment, such as for systems in which each burst or pre-defined period within a frame is sent to a specific receiver, the dummy burst can represent a burst that is sent to a non-existent or phantom terminal in the system. In this embodiment, each of the other receivers that are targeted by the basestation receive or use the dummy burst as a known period in which no actual desired signal is present.

Figure 2:
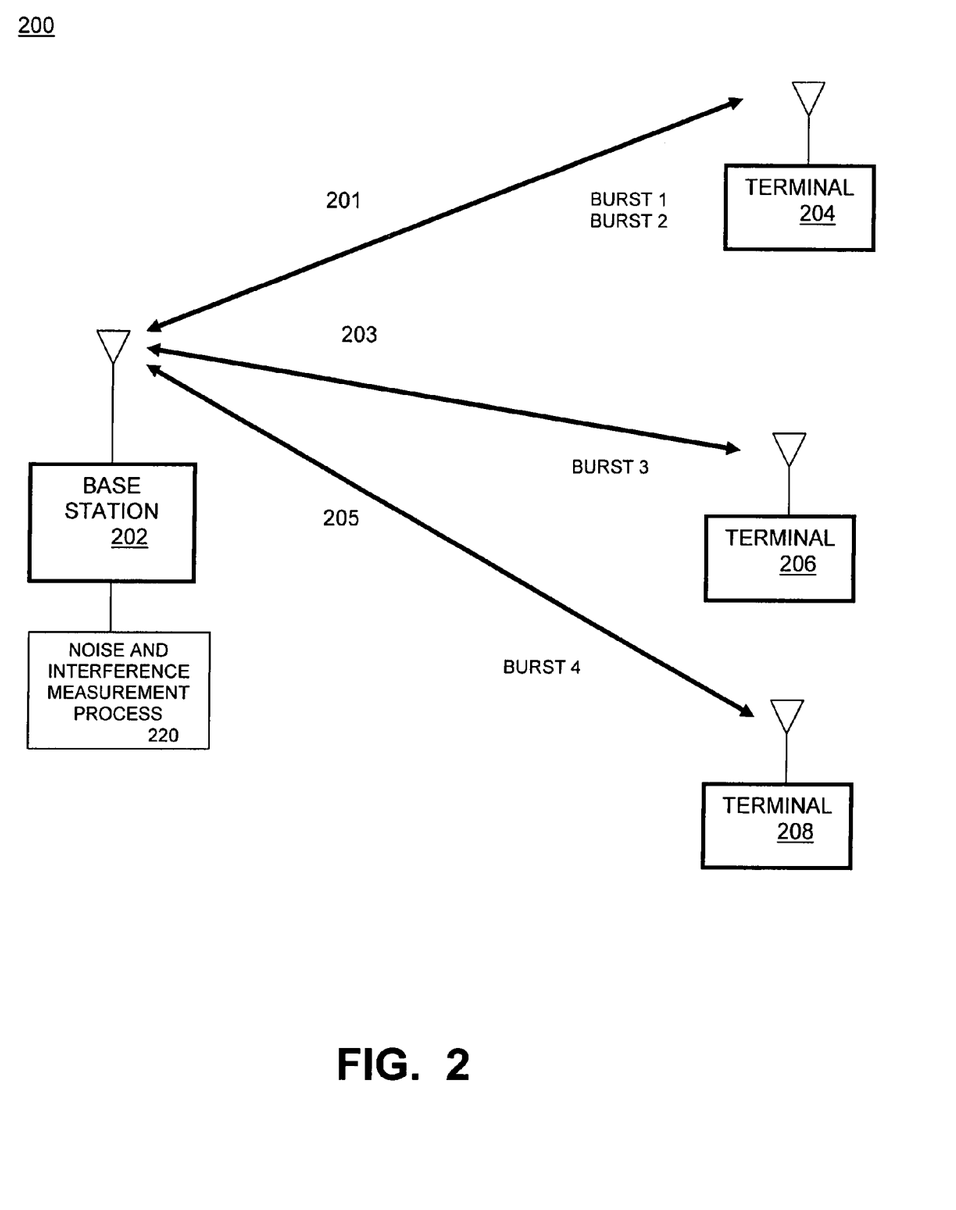
FIG. 2 illustrates the transmission of burst traffic in a network incorporating a noise and interference measurement method, according to embodiments.

FIG. 2 illustrates the transmission of burst traffic in a network incorporating a noise and interference measurement method, according to embodiments. In system 200, base station 202 communicates to a plurality of terminals 204, 206, and 208 over wireless links 201, 203, and 205, respectively. In OFDM or similar transmission methods, each frame is divided into a number of burst transmissions which are directed to a specific terminal. A basestation may transmit to a number of different terminals in a single frame, with each terminal receiving no bursts, or only a specific burst or bursts within each frame. Thus, as shown in FIG. 2, a frame may comprise bursts 1-4, and terminal 204 receives bursts 1 and 2 from basestation 202, terminal 206 receives burst 3, and terminal 208 receives burst 4 from base station 202. These bursts would be sent from the basestation to the terminals in a downlink frame or subframe.

Under an embodiment, each transmission in system 200 is organized in frames which include multiple OFDM symbols in time, such as for IEEE 802.16e and Wimax systems. Each OFDM symbol contains multiple OFDM tones in the frequency domain. For example, subframe 200 can represent an OFDM subframe in which OFDM tones are represented by the rows of the sub-frame matrices (along a vertical frequency axis), and the OFDM symbols are represented by the columns of the sub-frame matrices (along a horizontal time axis).

Figure 3:
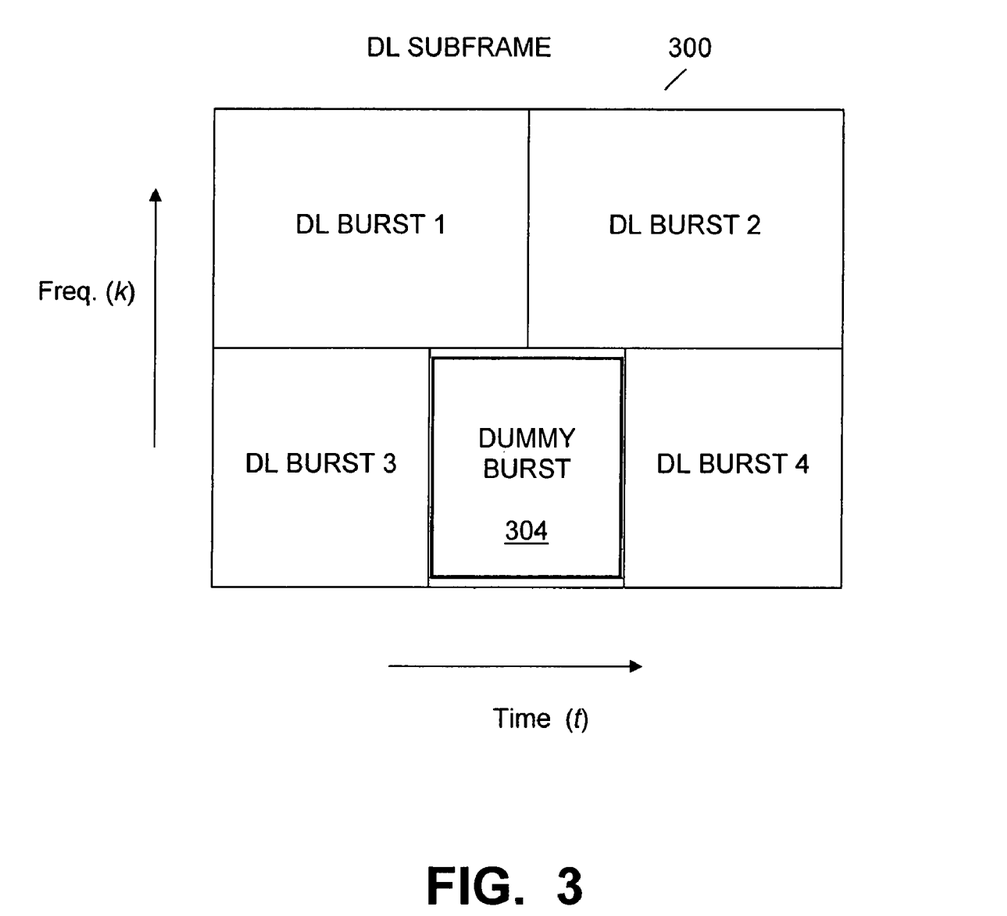
FIG. 3 illustrates an example of a time-frequency schedule for OFDM transmission using dummy bursts in a downlink subframe, according to an embodiment.

FIG. 3 illustrates an example of a time-frequency schedule for OFDM transmission using dummy bursts in a downlink subframe, according to an embodiment. For the embodiment of FIG. 3, the data is transmitted as a combination of frequency domain and time domain multiple access. Thus, the horizontal access represents the time domain (t), and the vertical access represents the frequency domain (k). In one embodiment, the example transmission represents the frame data for the network embodiment of FIG. 2. Thus, downlink bursts 1-4 are assigned specific time frequency slots 302 within the frame or subframe comprising the downlink data transmission. In a downlink transmission, each receiving terminal only receives the burst intended by the basestation to be received by the target terminal. Thus, with reference to FIG. 2, for the downlink subframe 300 transmission of FIG. 3, bursts 1 and 2 are intended to be received by terminal 204, burst 3 is intended to be received by terminal 206, and burst 4 is intended to be received by terminal 208.

In one embodiment, the noise interference measurement process 220 executed on the basestation 202 assigns a specific time-frequency slot to be a "dummy burst" 304. The dummy burst period 304 represents a particular pre-defined portion of the frame in which no actual data signal from the basestation is transmitted to any of the terminals which are targeted by the basestation. The dummy burst 304 may be targeted to a specific non-existent terminal, or it may be a null burst that is broadcast to all of the receivers assigned to basestation 202. In either embodiment, the target terminals are aware of the time-frequency location of the dummy burst within the frame. The client-side noise and interference measurement process running on each terminal listens for any signal levels during the dummy burst period. Since no desired signal level is present during this period, the client-side noise and interference process on the terminals can derive the amount of noise and interference received by the terminal by measuring signal levels during this dummy burst period. Each terminal may measure a different noise/interference signal level depending upon actual location, deployment details, and environmental characteristics associated with the terminal.

In a downlink transmission, the dummy burst 304 represents a pre-defined subframe location which the target terminals can use as a reference slot or time-frequency portion when they can be certain that no desired signal is being transmitted by the base station. During this period, any signal level that may be present is generally due exclusively to noise and interference effects in the network and the receiver.

Figure 4:
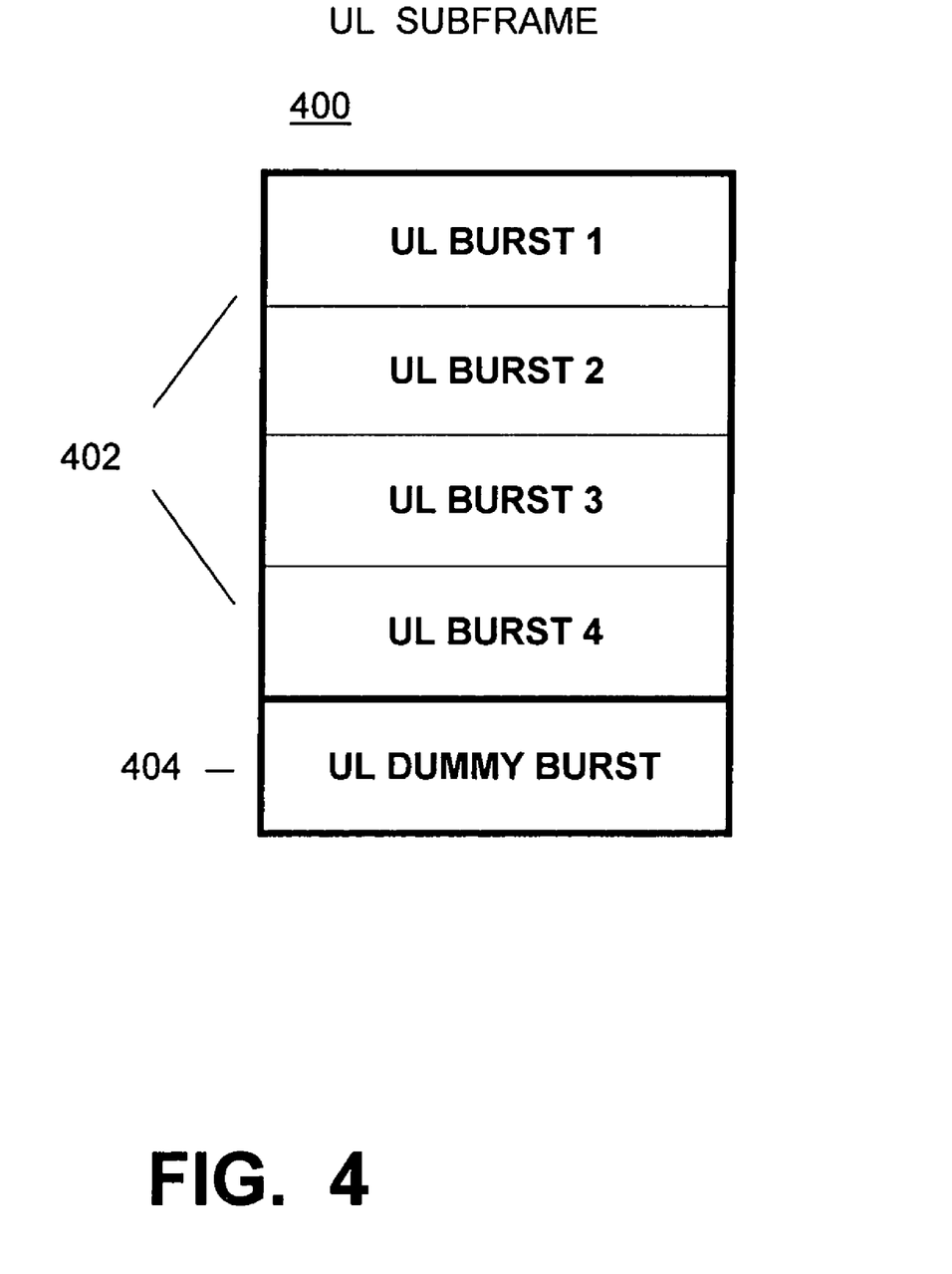
FIG. 4 illustrates an example of a time-frequency schedule for OFDM transmission using dummy bursts in an uplink subframe, according to an embodiment.

Similar to downlink transmissions, a dummy burst period is used in uplink transmissions between the terminals and basestation of FIG. 2 so that the basestation can determine the amount of noise and interference present in its own receiver stage during the uplink transmissions from each target terminal. FIG. 4 illustrates an example of time frequency schedule for OFDM transmission using dummy bursts in an uplink subframe, according to an embodiment. As shown in FIG. 4, uplink subframe 400 includes a number of uplink bursts 402, where each burst is sent from a specific terminal to the basestation. A specific burst period of the subframe is reserved by the basestation to be an uplink dummy burst 404. During this dummy burst period, no data is transmitted to the basestation by any terminal assigned to the basestation. The noise and interference measurement process running on the basestation listens for signal levels during this uplink dummy burst period. Any signals received during this period represent the noise and interference received by the basestation from sources other than the terminals assigned to the basestation.

The noise and interference measurement process may include a comparator process that compares the signal levels received during the dummy burst period to the signal levels received during the burst periods, or an average of the signal levels received during the burst periods of a subframe, in order to derive the relative signal strength of the noise and interference. This can be used to derive the SINR value for each subframe, or transmission link.

Although FIGS. 3 and 4 illustrates OFDM sub-frames with only a single dummy burst per downlink or uplink subframe, other embodiments may include more than one dummy burst per subframe, or dummy bursts of various durations relative to the bursts. As shown in FIG. 1, embodiments of the noise and interference measurement method may be implemented in network systems comprising multiple basestations and multiple terminals. In this embodiment, each basestation within any possible range of interference with any other basestation should reserve a different time-frequency slot for the dummy burst.

Each frame, sub-frame, or other organizational mechanism within a transmission stream between a basestation and a terminal may include a dummy burst. For this purpose, the term frame and subframe are used interchangeably to denote the main organizational group of content data for the transmission protocol used by the communication link between the basestation and terminal. The dummy burst may be in the same relative position within the frame, or it may be change from frame-to-frame according to a preset scheme or random assignment. Alternatively, a dummy burst may be employed during alternate or periodic frames in a transmission, such as in systems with reduced processing overhead for measurement of SINR levels.

The basestation and terminals utilize a pre-defined mechanism appropriate to the communications protocol to define the dummy burst location and communicate that location to the other basestation or terminals within the system.

Figure 5:
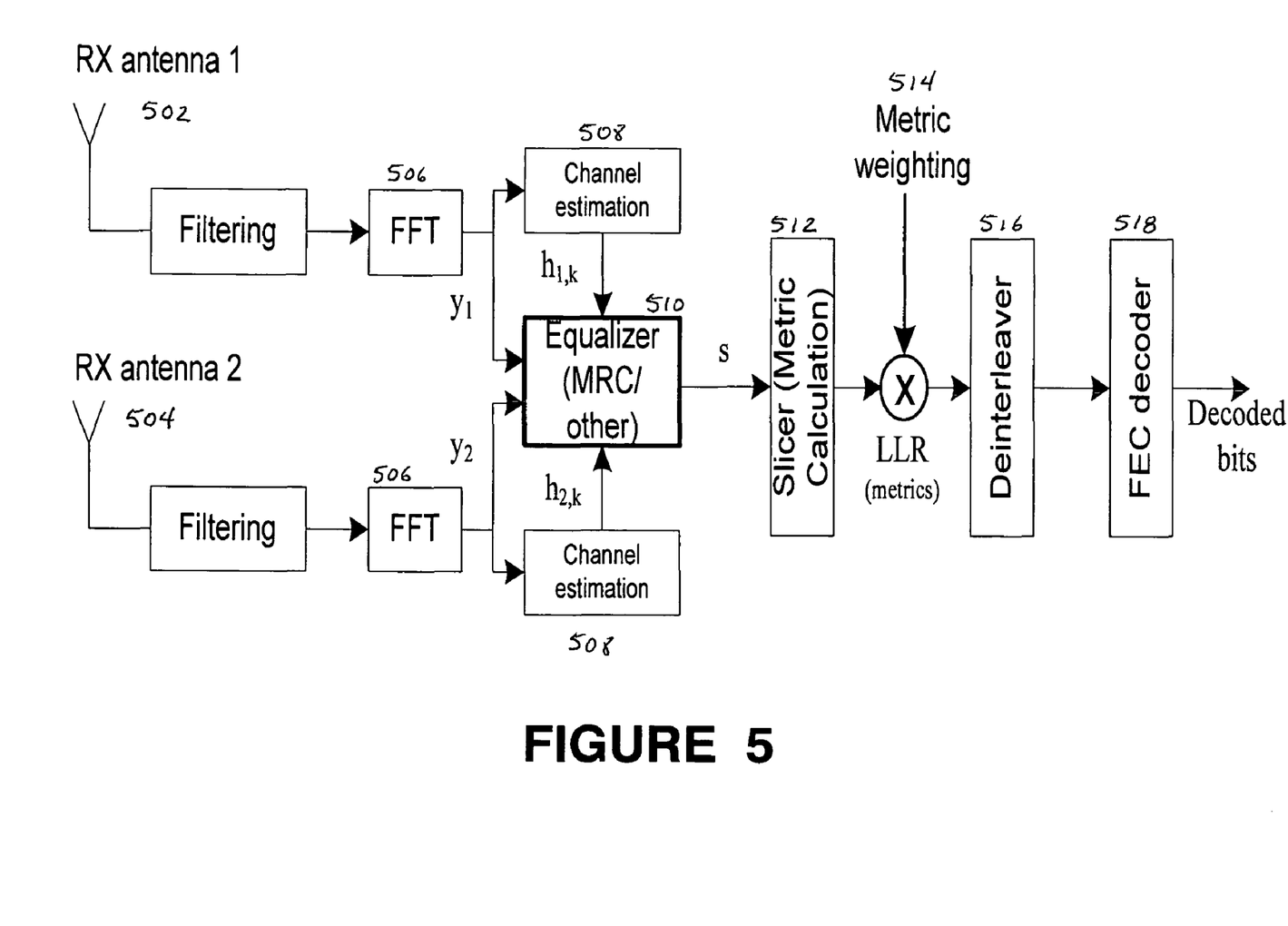
FIG. 5 is a block diagram of a receiver circuit that includes a noise power measurement system, under an embodiment.

Embodiments of the noise and interference measurement process for uplink and downlink transmissions can be implemented on a variety of different types of basestations and receiver terminals. FIG. 5 is a receiver structure in which the noise and interference measuring methods of an embodiment can be used. FIG. 5 illustrates an embodiment of a SIMO (Single Input Multiple Output) receiver that can implement embodiments of a basestation-side or client-side noise and interference measurement process. Thus, receiver 500 can represent a receiver circuit within a terminal or basestation. Receiver 500 includes two receiver antennae 502 and 504, each of which are processed through FFT (Fast Fourier Transform) circuits 506 and channel estimation 508 and equalization 510 circuits. An amount of preprocessing noise 505 and 507 are present at the outputs of the FFT circuits 506. Likewise, post-processing noise is present at the output of the equalizer circuit 510 before the signal is processed by subsequent digital processing circuitry, such as slicer 512, metric weighting circuit 514, de-interleaver 516, and decoder 518.

The noise and interference measurement process 120 and/or 122 can be implemented as a circuitry incorporated into a receiver, such as receiver 500, or it may be a software or firmware program executed by a processor or similar logic device incorporated in the receiver, or a separate processing circuit coupled to the receiver. Alternatively, it may be implemented as a remote process executed by a processing circuit separate from the receiver, such as in a transmitter or other remote platform.

Embodiments of the noise and interference measurement process allow a system designer or implementer to determine the noise and interference effects on the data. The amount of noise and interference in the dummy burst portion of each subframe determines the quality of the transmission link and generally dictates how much data can be carried on the transmission link between the basestation and each terminal. Such information can be used in various network management processes, such as link adaptation, power control, demodulation, decoding, and the like.

Although embodiments have been described with reference to OFDM transmission systems, it should be noted that the methodology described herein can also be applied to other types of wireless or wired networks that include frame or subframe organization that allows reservation of specific periods within the frame to be absent of any data transmission between a basestation and any terminals assigned to or targeted by the basestation.

Aspects of the noise and interference measurement methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the noise and interference measurement methods include: microcontrollers with memory (such as electronically erasable programmable read only memory (EEPROM)), embedded microprocessors, firmware, software, etc. Furthermore, aspects of the measurement methods may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that components of the systems and methods embodying the noise and interference measurement methods disclosed herein may be described using computer aided design tools and/or expressed (or represented) as data and/or instructions embodied in various computer-readable media, in terms of their behavioral, functional, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described systems and methods may be processed by a processing entity (e.g., one or more processors) within the computer system in conjunction with execution of one or more other computer programs.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the noise and interference measurement methods is not intended to be exhaustive or to limit the systems and methods to the precise form disclosed. While specific embodiments of, and examples for, the measurement methods are described herein for illustrative purposes, various equivalent modifications are possible within the scope of other systems and methods, as those skilled in the relevant art will recognize. The teachings of the noise and interference measurement methods provided herein can be applied to other processing systems and methods, not only for the systems and methods described above.

The elements and acts of the various embodiments described above can be combined to provide further embodiments. These and other changes can be made to the noise and interference measurement methods in light of the above detailed description.

What is claimed is:

1. A method of measuring noise and interference signal levels in a communication system comprising:
   receiving a first signal during a first period, wherein the first period is within a frame of data transmission defined by a protocol utilized by the communication system, wherein desired data is restricted from being transmitted during the first period, and wherein the first signal is a composite of noise and interference;
   receiving a second signal during a second period of the frame, wherein desired data is transmitted between a transmitter and a receiver within at least the second period of the frame, and wherein the second signal is a composite of a desired signal and said noise and interference; and
   comparing a signal level of the first signal to a signal level of the second signal to determine a relative signal strength of said noise and interference during the frame.

2. The method of claim 1, wherein the noise and interference comprise ambient noise and interference from at least one source other than the transmitter.

3. The method of claim 2, wherein the protocol defines one or more bursts in the frame, transmitted between the transmitter and one or more target receivers including the receiver, each burst intended to be received by a single receiver of the target receivers.

4. The method of claim 3, wherein the transmitter comprises a basestation, and the one or more bursts are transmitted from the basestation to the receiver in a downlink transmission.

5. The method of claim 3, wherein the receiver comprises a receiving terminal and the transmitter comprises a basestation.

6. The method of claim 1, wherein the communication system operates according to a wireless communication protocol.

7. The method of claim 6, wherein the wireless communication protocol comprises one of the group consisting of: IEEE 802.11, IEEE 801.16, WiMAX, and Zigbee protocols.

8. The method of claim 7, wherein the frame comprises a plurality of orthogonal frequency domain modulation (OFDM) symbols.

9. The method of claim 8, wherein the first period comprises a dummy burst reserved by the transmitter for measurement of noise and interference levels by the receiver during a downlink transmission.

10. An apparatus comprising:
    a receiver configured to receive a first signal during a first period of a frame, wherein desired data is restricted from being transmitted during the first period, and wherein the first signal is a composite of noise and interference, and to receive a second signal during a second period of the frame, wherein desired data is received from a transmitter during at least the second period of the frame, and wherein the second signal is a composite of a desired signal and said noise and interference;

a processor configured to measure a first signal level of the first signal and a second signal level of the second signal, and to compare the first signal level to the second signal level to determine a relative signal strength of said noise and interference during the frame.

11. The apparatus of claim 10, wherein the apparatus operates according to a wireless communication protocol, and wherein the wireless communication protocol comprises one of the group consisting of: IEEE 802.11, TEEE 801.16, Wimax, and Zigbee protocols.

12. The apparatus of claim 11, wherein the frame comprises a plurality of orthogonal frequency domain modulation (OFDM) symbols.

13. The apparatus of claim 12, wherein the first period comprises a dummy burst reserved by a basestation for measurement of noise and interference levels by the processor during a downlink transmission.

14. The apparatus of claim 10, wherein the noise and interference comprise ambient noise and interference from at least one source other than the transmitter.

15. The apparatus of claim 14, wherein the apparatus operates according to a wireless communication protocol, and wherein the wireless communication protocol defines one or more bursts in the frame, transmitted between the transmitter and one or more target receivers including the receiver, each burst intended to be received by a single receiver of the target receivers.

16. The apparatus of claim 15, wherein the transmitter comprises a basestation, and the one or more bursts are transmitted from the basestation to the receiver in a downlink transmission.

17. The apparatus of claim 15, wherein the receiver comprises a receiving terminal and the transmitter comprises a basestation.

* * * * *